(12) United States Patent
Morel et al.

(10) Patent No.: US 7,436,456 B2
(45) Date of Patent: Oct. 14, 2008

(54) VIDEO DEVICE AND METHOD FOR SYNCHRONISING TIME BASES OF VIDEO DEVICES

(75) Inventors: Philippe Morel, Rennes (FR); Pascal Malnoe, Rennes (FR); Didier Bellanger, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 418 days.

(21) Appl. No.: 10/781,418

(22) Filed: Feb. 18, 2004

(65) Prior Publication Data

US 2004/0227855 A1 Nov. 18, 2004

(30) Foreign Application Priority Data

Feb. 18, 2003 (EP) .................. 03290401

(51) Int. Cl.
*H04N 9/474* (2006.01)

(52) U.S. Cl. ........................ 348/512; 348/536

(58) Field of Classification Search ................ 348/500, 348/510, 512, 513, 514, 518, 536–49
See application file for complete search history.

(56) References Cited

U.S. PATENT DOCUMENTS

| | | | | |
|---|---|---|---|---|
| 3,435,141 A | | 3/1969 | Hileman et al. ............ | 178/69.5 |
| 5,303,050 A | * | 4/1994 | Nishimura et al. ........ | 348/211.2 |
| 5,523,852 A | | 6/1996 | Sowerby et al. | |
| 5,990,967 A | * | 11/1999 | Kawakami et al. .......... | 348/500 |
| 2002/0093590 A1 | | 7/2002 | Hodgkiss et al. | |

FOREIGN PATENT DOCUMENTS

| | | |
|---|---|---|
| DE | 40 30 148 | 3/1992 |
| EP | 0 516 378 | 12/1992 |
| EP | 0516378 A1 | 1/1997 |
| JP | 2001119607 A | 4/2001 |
| JP | 090037141 A | 9/2004 |

OTHER PUBLICATIONS

Search Report.
European Search Report dated Jun. 29, 2005.

* cited by examiner

*Primary Examiner*—M. Lee
(74) *Attorney, Agent, or Firm*—Joseph J. Laks; Robert D. Shedd

(57) ABSTRACT

A video system comprises a first video device which transmits a video signal comprising image information and synchronisation information and a second video device which receives the composite video signal. The second device has a time base. For synchronising the two devices synchronisation information is extracted from the video signal received by the second Video device and from the time base of the second video device; a phase difference between the video signal received by the second video device and the time base of the second video device is determined based on the extracted synchronisation information; control information of a first type representative of the amount of the phase difference is transmitted to the first device; and in the first device the phase of the video signal is switched by a phase angle represented by the first type control information.

11 Claims, 2 Drawing Sheets

VIDEO DEVICE AND METHOD FOR SYNCHRONISING TIME BASES OF VIDEO DEVICES

This application claims the benefit under 35 U.S.C. § 365 of European patent application No. 03290401.3 filed Feb. 18, 2003.

FIELD OF THE INVENTION

The present invention relates to a video device and to a method for synchronising time bases of a first video device which transmits a video signal and of a second video device which receives said video signal.

The video signal can be a native video signal generated by the first video device and comprising image information and synchronisation information derived from the time base of said first video device (composite video signal). Alternatively, the video signal can be a compressed digital stream obtained from the native video signal through a compression engine at a clock rate that is generally fully asynchronous to the image generation clock. In this case, image synchronisation information derived from the native time base is lost and packet synchronisation is added, providing the synchronisation information of the video signal.

A video signal is formed of a periodical sequence of images. Each image is formed of an integer number of lines. Each line comprises a number of points or pixels, which are spaced in time with a predefined frequency. This frequency is provided by an oscillator, usually a quartz oscillator. In conventional professional video equipment, the pixel frequency of the oscillator may be 27 MHz, there may be Np=1728 points or pixels to the line and Nl=625 lines (divided into two frames) to an image.

BACKGROUND OF THE INVENTION

The production of a live program generally requires the use of a plurality of cameras that are connected to a so-called mixer. Such a mixer may have various levels of sophistication. The simplest type of a mixer is a switch, which selects one of the various cameras and provides its video signal at an output of the mixer. More sophisticated mixers may be able to superimpose images from two cameras so as to create a progressive transition or to provide a combined output signal in which one region of an image is supplied by one camera and another region by a second camera. In order for such a mixer to work, the video signals from the various cameras present at the inputs of the mixer must be perfectly synchronised. Such a synchronisation implies that the pixel frequencies of the various cameras should be identical, and that at the input of the mixer there should be no phase difference between the images from the various cameras.

Conventionally, each camera and the mixer have a time base of their own. If these time bases operate independently from one another, the pixel frequencies generated by these time bases will never be perfectly identical, no matter how high the level of precision of the time bases is. Phase differences between signals from various cameras may be caused by varying length of transmission line between the camera and the mixer.

In order to achieve a synchronisation in spite of these problems, two approaches have been developed. A first approach is the so-called image synchroniser. Essentially, an image synchroniser can be regarded as a type of adaptable buffer between each camera and the mixer. Image data are written into the buffer at the rate at which they are generated by the camera, which is based on the pixel frequency of the camera. They are read from the buffer at the pixel frequency of the mixer. If the pixel frequency of the mixer is exactly the same as that of the camera, the synchroniser can be seen as a simple delay element. If the pixel frequency of the mixer is higher than that of the camera, a frame stored in the buffer may be read twice by the mixer before it is overwritten by the camera, and if the pixel frequency of the camera is higher than that of the mixer, a frame in the buffer may be skipped (overwritten without having being read by the mixer at all). The rate at which frames are read twice or skipped is depending on the frequency difference between camera and mixer frequencies. The image synchroniser is versatile and easy to control, but it has a disadvantage in that it causes an unpredictable delay, which may take any value between 0 and 1 image. Such a delay can be extremely embarrassing when mixing video and audio signals to produce the program content. So called "lip sync" effects (audio signal leading or lagging video signal) are noticeable and unwanted effects.

This type of problem can be avoided using the genlock approach. According to this approach, the pixel frequency of each camera is controlled to be strictly identical to a pixel frequency of the mixer, and the image phase of each camera is controlled to have a slight advance over the image phase of the mixer, the advance being determined based on the delay of the transmission line between the camera and the mixer, so that when the video signal from that camera arrives at an input of the mixer, its image phase is strictly the same as that of the mixer.

A common approach to video device synchronisation can be described as follows. In a video system comprising a first video device which transmits a composite video signal comprising image information and synchronisation information derived from a time base of said first video device and a second video device which receives said composite video signal, a) synchronisation information is extracted from the composite video signal received by the second video device and from the time base of the second video device;

b) horizontal and frame phase differences between the composite video signal received by the second video device and the time base of the second video device are determined based on said extracted H and F synchronisation information;

c) The horizontal phase difference is computed in the analogue domain, then applied to an integrator, resulting in a control voltage which will be sent on a line basis to the clock generation of the first device to shift up (or down) its frequency, reducing (or increasing) its line and frame duration until the horizontal phase difference is cancelled. This technique is well known as Phase Lock Loop.

d) The frame phase difference is processed in the following way: according to its value, a reset pulse is generated and transmitted on a frame or sub-frame basis to said first device to alter once only its regular (self running) period at a precise time.

Generally those two kinds of information (analogue proportional for frequency and horizontal phase control; vertical reset for frame control) are combined to be sent to the first device.

It must be highlighted that the transmission media of the control information to the first video device must have predictable and reproducible delay. Otherwise, the reset pulse may be too soon or too late resulting in an erratic permanently wrong time base sequence.

Another specific example of a video camera system vertical reset processing is described in patent DE 40 30 148 C2.

In this document, a frame phase difference between the sync pulses received from the camera and sync pulses generated by a local time base of the camera control unit is computed. If such a frame phase difference exists, a reset impulse is sent to the camera which will cause a phase shift of the image signal it generates (and, hence, of the V sync signal) which is equivalent to one image line. This process is repeated once per image (i.e. frame) until the control units finds that the V sync pulses from the camera and from the local time base are in phase. Since the number of lines in conventional video images according to e.g. PAL and SECAM standards is 625, this prior art system may need several seconds in order to bring the V sync pulses of the camera and of the control unit into alignment. Furthermore, it relies also on a perfectly predictable transmission delay of the reset pulse.

There is thus a need for a fast method for synchronising time bases of video devices and for a video device with fast synchronisation, notably when the devices are linked by 2 transmission media whose transmission delay may be varying over time.

SUMMARY OF THE INVENTION

The invention proposes a method for use in a video system comprising a first video device which transmits a video signal comprising image information and synchronisation information and a second video device which receives said video signal, having the following steps:

a) synchronisation information is extracted from the video signal received by the second video device and from the time base of the second video device;

b) a phase difference between the video signal received by the second video device and the time base of the second video device is determined based on said extracted synchronisation information;

c) control information of a first type representative of the amount of said phase difference is transmitted to said first device; and d) in said first device the phase of the video signal is switched by a phase angle represented by said control information of a first type.

It is not only determined that a phase difference exists and whether the phase difference is an advance or a delay, but a quantitative measure of the phase difference is established and transmitted to the first device, whereby the first device is enabled to adapt its phase in a single step. Accordingly, one image period may be sufficient to determine the phase difference and to correct it.

It is generally sufficient to carry out the method once when the first and/or the second video device is switched on; but preferably, at least steps a) to b) are cyclically repeated. Steps c) and d) may also be repeated, but preferably, they are only carried out if the phase difference represented by the first type control information is different from 0, i.e. if there is indeed a phase difference to correct. In this way, the transmission bandwidth from the second to the first device that is required for carrying out the method is made extremely small.

According to a preferred embodiment, the control information is a binary data word having a predefined number of bits, the number being at least 2.

Further, the method preferably has the additional steps of e) determining the first type control information and control information of a second type such that the sum of phase differences represented by said first and second type control information is the phase difference determined in step b), f) transmitting the second type control information to said first device, too, and g) applying a phase shift as represented by said second type control information to the composite video signal in said first device.

By restricting the number of bits the first type control information may have, the time required for transmitting this information to the first device is kept small. The fact that this first type control information only has a limited resolution is compensated by further transmitting the second type control information, which allows for a fine adjustment of the image phase in the first video device. The mechanism for applying the phase shift represented by the second type control information to the composite video signal may be different from the abrupt switching which is carried out based on the first type control information. Preferably, this fine adjustment of the phase shift is carried out by increasing or decreasing the pixel frequency of the time base of the first device according to the sign of the phase shift represented by said second type control information. I.e., if the phase of the video signal from the first device is found to be in advance over that of the second device, the pixel frequency of the first device will be reduced based on the second type control information until the phases are found to coincide, and if the phase of the video signal from the first device is delayed with respect to that of the second device, the pixel frequency of the first device will be increased until the phases coincide.

Preferably, a time for carrying out step d) is chosen according to the phase difference determined in step b) such that after carrying out step d) the video signal at the first device assumes a predefined phase, preferably the beginning of an image in the video signal. In this way, a discontinuity of the image information received by the second video device can be avoided.

The invention proposes the following preferred features:

the H phase difference is computed in digital domain, then optionally processed through a non linear stage, whose purpose is to reduce the number of bits to be transmitted. Such a transfer law keeps all the resolution of the H phase difference if small values are to be transmitted. The higher the value to be transmitted is, the more rounding is allowed, since this rounding will not affect the steady state (small values around zero). So the transmitted data is composed of a "range" field and a "data" field. The range field (e.g 3 bits) conveys a two's power multiplication factor to be applied to the data field which is signed value.

in the camera, the reverse operation is performed, and the approximate H phase difference is applied to a digital filter (PI), resulting in a control signal which will be either converted in analogue domain or control a Direct Digital Synthesizer. On both cases the clock generation of the first device will shift up (or down) its frequency, reducing (or increasing) its line and frame duration until the H phase difference is cancelled. Three advantages of this technique appear first, the transmission rate of the H phase difference can be much lower than its analogue counterpart; second, it is totally protected against transmission noise; last, the transmission media may have even drop-outs since the latest digital control signal is always available.

the F (frame) phase difference is also processed in a non-classical way: instead of generating a reset pulse in the receiving device, the F phase difference, computed in the digital domain and rounded to the nearest integer number of lines is directly transmitted on a frame or sub-frame basis to said first device.

in the first device, the F phase difference is used in conjunction with the time base to generate locally the reset pulse, which will alter once only its regular (self running) period at a precise time. The advantage of this innovation is amazing: it no longer matters which delay has been needed to transmit the F phase difference, the reset pulse will always occur at the right time.

As mentioned above already, it is common in the art that the image information comprised in the composite video signal is formed of a sequence of images, each image comprising a plurality of lines. In this case, the first type (V phase) control information preferably is representative of a number of lines by which the composite video signal received from the first video device is phase shifted with respect to the time base of the second device. Specifically, if the number of lines to an image is 625, the first type control information will have to be a binary word of at least 10 bits in order to be able to represent all possible phase differences between the two video signals with a resolution of one line.

When a conventional analogue video signal is directly transmitted from the first to the second video device, the transmission delay between the two devices will usually be constant as long as the devices are under operation and the transmission line between the two is not modified.

If digital compression is needed prior to transmission (for instance in case of a digital wireless transmission), packet oriented transmission is used between the two devices and the delay between the generation of say the first pixel of an image data and the header of the packet that identify the beginning of the corresponding compressed field at the first device may vary. Synchronisation impulses of the "native" video signals are then either not available in the data stream or no longer a reliable basis for controlling the pixel frequency of the first device. This is due to many reasons: the transmission clock is generally asynchronous to the video generating clock, the compression time may vary upon picture content, and the stuffing mechanism needed to adapt exactly the data rate of the compressed video to that of the transmission media introduces a non predictable delay.

Another important feature for such compressed video transmission system is that the compression and decompression engines has the same pixel clock frequencies. This is a requirement to avoid FIFO overrun conditions. Basically, in a classical MPEG broadcast chain, the pixel clock recovery for the decompression engine is performed at the receiver side using a (first) PLL principle. But this would not be sufficient for the synchronisation of the first device on the mixer pixel clock. There should be necessary to nest a second PLL to ensure that pixel clock of the compression engine and the mixer are ALSO to the same frequency. Nesting 2 PLL is quite tricky for stability and jitter reasons well known from engineers. The invention brings a solution that avoids nesting of 2 PLLs.

It also gets rid of the basic assumption to link pixel frequency control and H phase. In all synchronisation systems dealing with video sync pulses, the H phase PLL modifies the pixel frequency until the H phase is correct. This is due to the fact that H phase is the integral of the pixel frequency. It may result in very slow behaviour. The invention splits the pixel frequency control and (H&V) phase control into 2 separate processes, allowing much quicker locking time.

So, if the "native" video signal is compressed prior to transmission in digital form as a sequence of data packets, it is preferred that the synchronisation information which is required by the second device comprise a sending time data which is included in at least some of the data packets, which is derived from the time base of the first device and representative of the time base status at the sending time of the packet in which this data is included, and that each of these sending time data, upon receipt by the second device, is compared to receiving time data derived in a similar way from the time base of the second device, and that the frequency error information for controlling the pixel frequency of the second device is computed from a difference between said sending and receiving time data.

In particular, the first device may comprise a first counter operating based on a pixel frequency derived from the time base of said first device, and the second device may comprise a second counter operating based on a pixel frequency derived from the time base of said second device, and a counting value of said first counter at sending time is included in a data packet as the sending time data and is compared to a counting value of said second counter as receiving time data upon receipt by the second device.

When the first or the second device is switched on, the difference between counting values of these two counters may have an arbitrary value. If this difference exceeds a given threshold, the second counter is set only once to the value received from the first counter. If a subsequent counting value is received from the first video device, it should be identical to the counting value of the second counter, provided that the pixel frequencies of the two devices are identical. Any non-vanishing difference between the two counting values is indicative of a difference of the two pixel frequencies and should be made 0 by controlling the pixel frequency of the first device.

A first video device according to the present invention has an output port for outputting a video signal, an input port for inputting control information and a time base which is adapted to switch the phase of a video signal output at said output port by a phase angle specified by a first type of said control information. Preferably, the time base of the first device is further adapted to set a pixel frequency of said video signal according to a second type of said control information.

A second video device according to the invention has an input port for inputting a video signal, means for determining a phase angle between the input video signal and a time base of said second video device, and an output port for outputting control information quantitatively specifying said phase angle.

Preferably, the first video device has an output port for outputting a compressed data stream from a compression engine processing the video signal, an input port for inputting V control information and a time base which is adapted to switch the phase of the video signal and thus the compressed data stream output at said output port by a phase angle specified by a first type of said control information. Also, the time base of the first device is further adapted to set a pixel frequency of said video signal according to a second type of said frequency control information.

Preferably, the second video device has an input port for inputting the compressed data stream issued by the first device, a reference input representative of video timing requested by the mixer (Pixel frequency, H & V phase), a decompression engine, whose pixel clock is obtained from the reference input signal, and capable to re-build the video signal out of the compressed data stream, and means for determining a frequency error between the reference pixel frequency and the compression engine pixel frequency, as well as a phase angle between the output video signal and reference H & V signals of said second video device, and an output port for outputting control information quantitatively specifying said frequency error and V phase angle.

BRIEF DESCRIPTION OF THE DRAWINGS

Further features and advantages of the present invention will become apparent from the subsequent description of an embodiment thereof referring to the appended drawing. In the drawing.

DETAILED DESCRIPTION OF PREFERRED EMBODIMENTS

Figure 1:
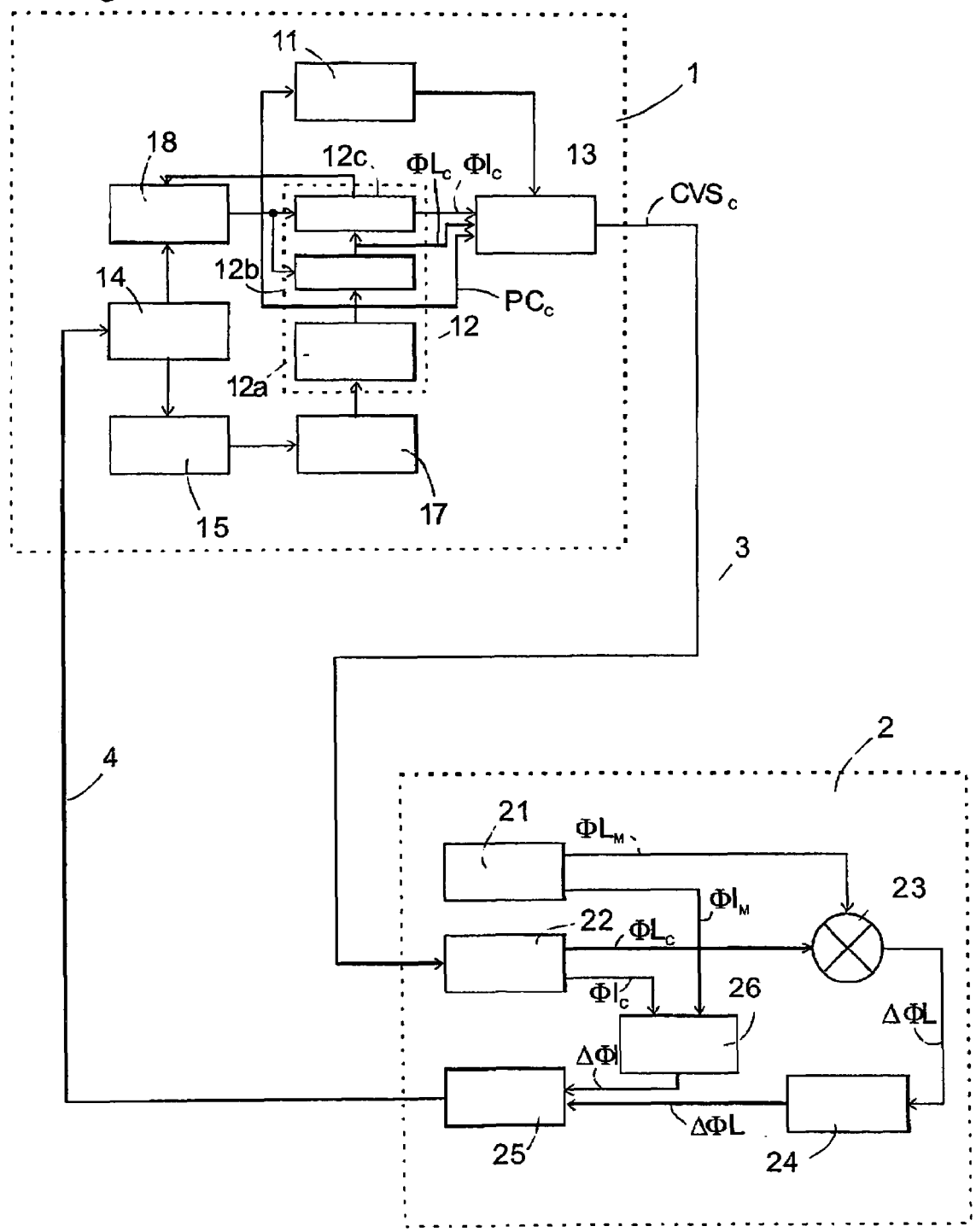
FIG. 1 is a block diagram of a video system comprising first and second video devices according to the invention, wherein an analogue video signal is transmitted from the first device to the second.

In FIG. 1, the first video device is a camera 1, and the second video device is a receiving part (generally so called Base Station or Camera Control Unit) 2 which receives an analogue composite video signal from the camera 1 by a downlink transmission line 3, e.g. a coaxial wire, optical fiber, or wireless analogue transmission system, and sends video signal to the mixer (not shown) and control information to the camera 1 by an uplink transmission line 4, which may be a second coaxial wire, optical fibre, or wireless analogue transmission system. Although not shown, the mixer will generally have more than one input port for connecting a plurality of cameras or other sources of video signals by means of transmission lines which may vary in length and thus cause varying transmission delays between the image signal source and the CCU 2.

The camera 1 comprises an imager chip 11, e.g. a charge coupled device (CCD) onto which light from a scenery is incident and from which images are read out at a predefined image frequency. The imager chip 11 has a large number of pixels arranged in a matrix of rows and columns. For the sake of simplicity, it will be assumed that the number of rows and columns is the same as the number of lines and pixels per line in the video signal generated by the camera, although this is not a requirement. Readout from the imager chip 11 is carried out under control of a pixel clock signal from voltage controlled oscillator 12a of time base 12, and data defining colour and brightness of individual pixels are output pixel after pixel and line after line to a composite video signal generating circuit 13. Time base 12 further comprises counters 12b, 12c that operate as frequency dividers on the pixel clock signal PCc and provide synchronisation impulses $\Phi L_C$, $\Phi I_C$ at a rate of one per image line from counter 12b and one per image from counter 12c to composite video signal generating circuit 13.

Based on the signals received from imager chip 11 and time base 12, the circuit 13 generates a conventional composite video signal $CVS_C$ in which active signal corresponding to each image line are separated by blanks, and an image synchronisation impulse is inserted between the last active line of one field and the first active line of the subsequent field and line synchronisation impulses are inserted in the blanks between active lines of one image. Conventionally, in the composite video signal each image is transmitted as two consecutive interlaced fields, one comprising odd numbered lines of the image and the other comprising even numbered lines, and a third type of synchronisation impulse is inserted in a blank between the two fields of one image. However, this third type is of no further relevance for the present invention and will not be discussed here, the invention being applicable to interlaced and non-interlaced video signals alike.

The CCU 2 has a time base 21 of its own, which provides a pixel clock signal $PC_M$ and line synchronisation impulse signals $\Phi L_M$, $\Phi I_M$ and image synchronisation impulse signals quite in the same way as the time base 12 of the camera 1 does. This time base may be free running, or more likely the time base of the CCU will be itself locked on the reference signal (as so called Black and Burst signal) from the mixer. The time base of the mixer thus provides a time standard to which operation of all time bases of CCUs and cameras or other image sources connected to the mixer have to be synchronised such that at each input port of the mixer, the beginnings of individual images in the composite video signals will be exactly aligned, so that a switchover between different input ports is possible.

In order to achieve such a synchronisation, a synchronisation extracting circuit 22 is connected to the input port of mixer 2. Line synchronisation signals $\Phi L_C$ from extracting circuit 22 and $\Phi L_M$ from time base 21 are supplied to a phase comparator 23. An output signal $\Delta \Phi L$ of the phase comparator 23 representative of the phase difference between the two line synchronisation signals is supplied to a sampling and converting circuit 24. The converting circuit 24 samples the phase error signal from phase comparator 23 at regular time intervals, e.g. at the line frequency or a sub-multiple of it, and provides digital data representative of the H phase delay to a modulating circuit 25.

Image synchronisation impulses $\Phi I_M$ from the time base 21 and $\Phi I_C$ from the extracting circuit 22 are supplied to a V delay measuring circuit 26. This delay measuring circuit 26 may be a phase comparator similar in structure to the phase comparator 23 but measuring not the phase difference between line synchronisation impulses but between image synchronisation impulses. The delay measuring circuit 26 may also be a counter having a trigger input to which one of the image synchronisation signals, e.g. the signal from extracting circuit 22, is connected, a stop input to which the other image synchronisation signal from time base 21 is connected, and a counting impulse input to which the line synchronisation signal from either extracting circuit 22 or time base 21 is connected. Such a counter will begin to count image lines identified by impulses of the line synchronisation signal when it receives an impulse indicating the beginning of an image at its trigger input, and it will stop counting when it receives an impulse on the stop input, so that the counting value $\Delta \Phi I$ thus obtained gives the number of lines by which the video signal from the camera 1 is in advance over the local video signal of the mixer. This counting value is also supplied to modulating circuit 25. The modulating circuit 25 transmits the control information supplied by converting circuit 24 and measuring circuit 26 into a format suitable for transmission on uplink transmission line 4 and transmits it at any suitable instant.

At the camera 1, a digital demodulating circuit 14 receives the control information sent by modulating circuit 25 and supplies the phase difference value $\Delta \Phi L$ obtained by converting circuit 24 to a digital loop filter 15. Based on this input, the loop filter 15 calculates a control voltage which is supplied to a voltage controlled oscillator 12a via a DAC 17. Another kind of implementation could use a Direct Digital Synthesizer and a free running clock generator, the digital output of the loop filter being applied to the DDS control without D to A conversion. The control voltage defines the frequency of pixel clock $PC_C$ delivered by oscillator 12a to counters 12b, 12c of time base 12. The phase comparator 23, loop filter 15 and oscillator 12a thus form a phase lock loop for controlling the pixel clock frequency $PC_C$ of camera 1. Since phase lock loops as such and their operation is generally known in the art, the operation of this phase lock loop will not be further described in detail. For the purpose of the present invention, it is sufficient to realize that according to the sign of the phase difference ΔΦL detected by phase comparator 23, the pixel frequency of oscillator 12a will be increased or decreased until the line synchronisation impulses of the video signal from the camera 1 and the local video signal of the mixer are found to be perfectly aligned.

The demodulating circuit 14 further supplies the counting value obtained by delay measuring circuit 26 to a reset circuit 18 of camera 1. The reset circuit 18 receives a signal indicating the current status of counters 12b and 12c. When this status becomes equal a counting value nd obtained by measuring circuit 26, the reset circuit 18 will reset the counters 12b, 12c of time base 12 and the video signal generating circuit 13 at the end of line number nd, thus causing the video signal generating circuit 13 to cancel current image generation and to begin outputting a new image. In this way, the image phase of the video signal is instantaneously advanced by a phase angle of 2 πnd/Nl, (Nl being the number of lines in one image) whereby the phase difference between the image signals at the mixer is reduced to the equivalent of less than one line.

Since the adjustment of the image phase takes places by multiples of one line, it has no influence on the line phase difference determined by phase comparator 23. The "coarse adjustment" of the image phase by phase switching using reset circuit 18 and the fine adjustment using the phase lock loop are therefore completely independent from one another. For carrying out the coarse adjustment, not more than one image period is required for measuring the image phase difference between the two video signals, and depending on the amount of the phase difference, its correction can be carried out within the same or a subsequent image. In total, the time required for coarse adjustment is not more than two image periods. Accordingly, when the camera 1 or the CCU 2 is switched on, a complete Vertical synchronisation of the composite video signals is achieved within not more than 40 ms. The horizontal synchronisation may take more time depending on loop filter and VCXO constraints.

In principle, the delay measuring circuit 26 might measure the relative delay of the two composite video signals once per image. However, if the coarse adjustment of the image phase has been carried out once, the counting value of measuring circuit 26 will generally be zero, and there is no more need for switching the image phase using reset circuit 18. Accordingly, if the counting value of measuring circuit 26 is zero, it is not necessary either, to transmit this counting value to the camera 1, so that bandwidth of the uplink transmission line 4 may be saved for other purposes.

Figure 2:
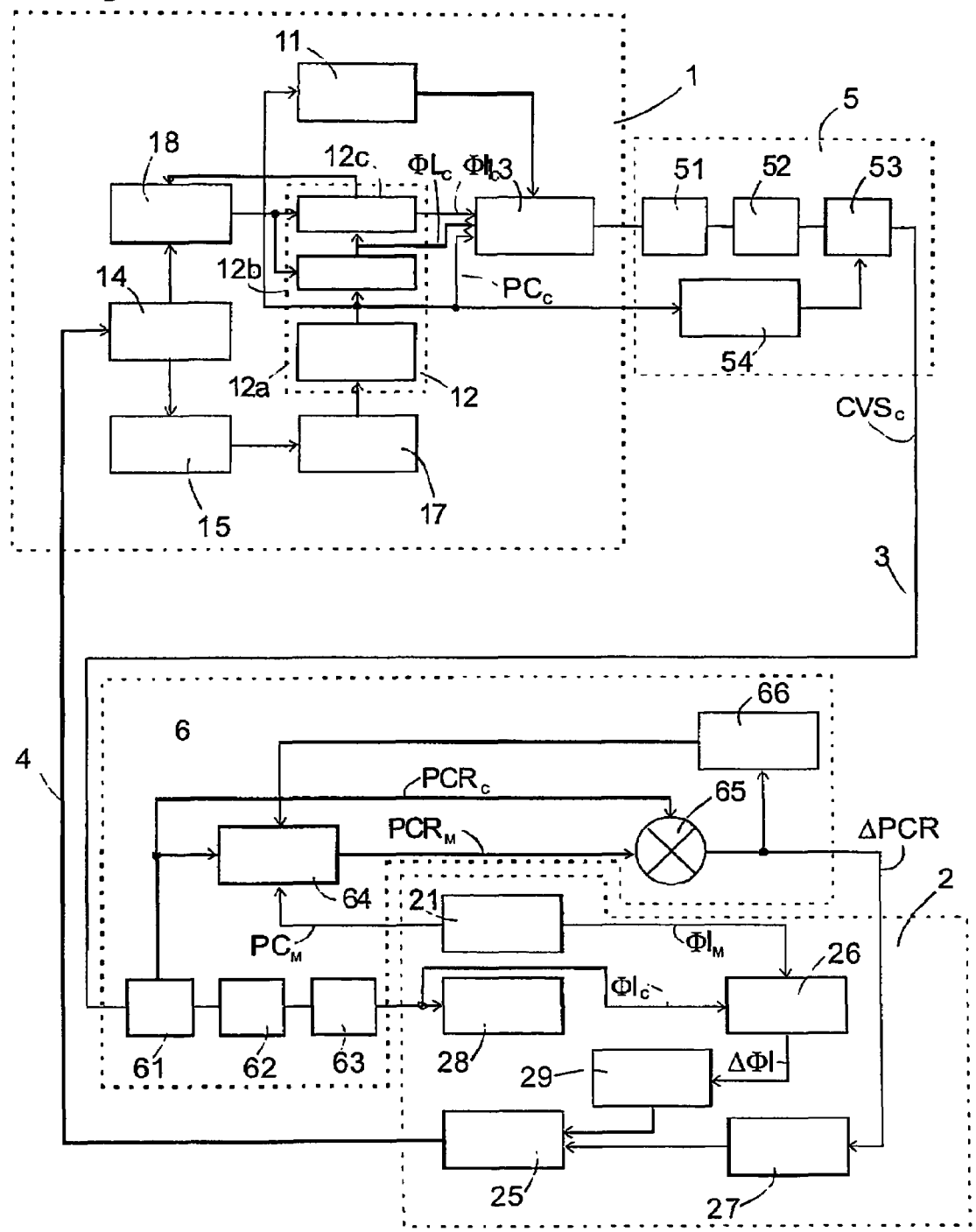
FIG. 2 is a block diagram of a video system comprising first and second video devices, wherein a digital compressed data stream is transmitted from the first to the second device.

FIG. 2 is block diagram of a video system comprising a camera and a CCU 2, in which a video signal comprising image information and image synchronisation information is compressed and transmitted in digital form on downlink transmission line 3. Since digital transmission of the video signal requires considerable bandwidth, the transmission line may be an optical fibre, or using digital modulation techniques such as single carrier or multi carriers, the resulting spectrum may also be suitable for radio (wireless) transmission.

In the camera 1, the imager chip 11, time base 12, demodulating circuit 14, loop filter 15, (voltage controlled oscillator 12a and DAC 17) or (DDS) and reset circuit 18 are the same as in FIG. 1 and need not be described again. The video signal generating circuit 13 may be slightly different from that of FIG. 1 in that it does not convert the pixel data received from imager chip 11 into an analogue video signal but provides a train of digital data comprising image information and image synchronisation information and supplies it to a data compression circuit 51 of a sending interface 5 inserted between the camera 1 and the downlink transmission line 3. The output of data compression circuit 51 is connected to a FIFO buffer 52 in which the compressed video data stream are temporarily stored before being handed on to a packet forming circuit 53 which groups the data into packets having a format suitable for transmission on the downlink transmission line 3. Also not shown on this block diagram for sake of simplification, a digital modulation circuit and RF up converter may be inserted between the output of circuit 53 and the transmission media. This is especially true in case of radio transmission.

The compressibility of the image information received from video signal generating circuit 13 may vary according to the complexity of the image represented by these data. Therefore, the data rate at the output of compression circuit 51 may vary. To provide a constant data rate to the modulation circuit, 3 known mechanism are used: Any compression engine has inputs for reducing/increasing the output bit rate. It is the role of servo loop, not represented here fore sake of simplicity, to measure the output bit rate, compare it to the requested one and to compress more or less the video to tend to the wanted bit rate. However, this servo loop is generally too slow to prevent short time over run or under run. The FIFO buffer 52 absorbs such fluctuating data rates. Further, a stuffing mechanism allow to generate dummy packets that will be generated automatically if an under run condition occurs so that the packet forming circuit 53 supplies the data at a constant rate to the modulation circuit. In this way, a constant data rate on the downlink transmission line 3 can be always maintained, and its transmission capacity is used efficiently. However, this causes a problem in that the sending interface 5 causes a delay of the transmission of the video signal that may vary in time during operation of the camera 1 and the mixer 2. The video related synchronisation information possibly included in the compressed image data from signal generating circuit 13 is therefore no longer a reliable basis for estimating image and line phase differences between the two video signals at the CCU 2.

This problem is solved by inserting additional time information (so called Time Stamp) as supplemental synchronisation information into the data packets to be transmitted on downlink transmission line 3 at the packet forming circuit 53, immediately prior to sending of these packets. This additional Time Stamp information is a counting value referred to as PCR in analogy to a similar quantity named PCR in the MPEG standard. The PCR is supplied by a PCR counter 54 that counts impulses of the pixel clock signal from oscillator 12a. The PCR need not be included in all packets sent to the mixer; it is sufficient that there are PCRs in a sub-multiple of the packets. In principle, the packets in which PCRs are included might be chosen arbitrarily and at variable intervals.

At the receiving end of downlink transmission line 3, also not shown on this block diagram for sake of simplification, a RF down converter and digital demodulation circuit may be inserted in front of the receiving interface 6. This is especially true in case of radio transmission. The receiving interface 6 comprising an unpacking and PCR extraction circuit 61 whose function is inverse to that of packet forming circuit 53, a FIFO buffer 62 and a data decompression circuit 63 whose function is inverse to that of compression circuit 51. The pixel clock of the decompression engine is directly derived from the mixer reference signal. Thus, at the output of decompression circuit 63, the data sequence input into a compression circuit 51 is reconstructed.

The unpacking and PCR extraction circuit 61 separates a PCR contained in a data packet from the digitised video signal contained therein and outputs it to a PCR generator 64 and to a first input of a comparator 65. The PCR generator comprises a PCR counter similar to PCR counter 54 at the sending side, which counts pulses of the pixel clock signal $PC_M$ provided by time base 21, and an interface circuit that will output the current PCR of this counter to a second input of comparator 65, when it is triggered by a PCR it receives from extracting circuit 61.

Immediately after switching on the camera 1 and/or the CCU 2, the difference between the PCRs at the two inputs of comparator 65 is completely arbitrary. If the difference exceeds a threshold corresponding to a predefined fraction of an image period, an initialising circuit 66 connected to the output of comparator 65 will set the PCR of PCR generator 64 equal to the PCR received from the camera 1. If the pixel frequencies of the camera 1 and of the CCU 2 are identical, the PCRs will run alike, and whenever the camera 1 sends a further PCR, it is expected to be the same as the PCR of PCR generator 64. If there is a difference between the two PCRs, it is representative of a difference of the pixel frequencies of camera 1 and CCU 2. The threshold of the initialising circuit 66 and the time between two packets with PCR from the camera 1 are chosen based on the expected exactness of the two pixel clock signals so that once the PCR generator 64 has been initialised, the PCR difference detected by comparator 65 will usually not exceed the threshold of the initialising circuit 66. This PCR difference is supplied to a data compression circuit 27. This optional circuit allows a further bit rate reduction without compromise on settling time. The idea here is that at the steady state, the PCR difference is close to zero and needs to be transmitted with full precision, whereas at settling time the PCR difference may be quite important but does not need a high precision. So for range 0 (small values either positive or negative around zero), the number of bits to code exactly the value is small. For range 1, (absolute values twice greater than those of range 0), the PCR difference is rounded to the nearest multiple of 2, and shifted down, loosing resolution but saving number of bits to be transmitted. For range 2, (absolute values twice greater than those of range 1), the PCR difference is rounded to the nearest multiple of 4, and shifted down, loosing again resolution but saving even more number of bits to be transmitted. The principle can be repeated at wish. Since the PLL is by principle a closed loop system, the resolution compromise will not alter the locking process. The resulting data couple (range, data) is send to a modulating circuit 25, from where it is transmitted to camera 1 by uplink transmission media 4, demodulated in demodulating circuit 14, decompressed in decompression circuit 19 regenerating data out of (range, data) couple and supplied as a control signal to loop filter 15. In this way, the pixel frequency $PC_C$ of camera 1 is maintained equal to the pixel frequency $PC_M$ of mixer 2.

Decompressed image data output from decompression circuit 63 goes through a variable delay buffer 28 that can be set to any delay between zero and ZM, ZM being the variation of transmission times of the data packets between camera 1 and CCU 2 caused for instance by the variable delay of the compressed data in FIFO buffer 52, as well as pure propagation delays in digital modulators and demodulators. The function of the variable buffer 28 is somewhat similar to that of an image synchroniser, but it is distinguished from an image synchroniser in that time-averaged data rates of input and output of data in the buffer 28 are strictly equal, and that no data are discarded in the buffer 28 or read twice from it. It may be described as a FIFO whose depth is large enough to store a few lines, and whose writing and reading mechanisms are as follows. Writing first data of image will occur at the first location of the FIFO, and following data will be written at incremented addresses. Reading first data out of the FIFO will occur at the beginning of active image as requested by the reference signal. Writing of first data must occur 0 to ZM clock pulses before reading it, otherwise a FIFO overrun will occur. So the delay of the FIFO needs no calculation, as it is automatically dependent on the leading time (0 to ZM) of the video delivered by the decompression engine and the reference signal.

A delay measuring circuit 26 similar to that of FIG. 1 is connected to time base 21 and the output of decompression engine 63 in order to determine the image phase difference between the output video signal from decompression engine 63 and the local reference signal of the mixer (and local time base 21). The measured V phase difference will then be offset so to take into account the 0 to ZM additional delay. In other words, the V phase measuring circuit will calculate and transmit a value to the reset circuit 18 such as after reset has occurred, the output of the decompression engine should be in slight advance (ZM/2) with respect to the reference signal delivered by the mixer. As ZM is the peak-to-peak variation of the propagation delay of the whole transmission path from CCD output of camera to decompression engine, the delay element will be in its best operating conditions to add a 0 to ZM delay without overrun conditions. If the so measured V phase difference exceeds the delay fluctuation ZM, it is transmitted to reset circuit 18 of the camera 1 via a compression circuit 29, modulating circuit 25, uplink transmission line 4 and demodulating circuit 14. In reset circuit 18, it is used to switch the phases of time base 12 and video signal generating circuit 13 as described with respect to FIG. 1. If the phase difference measured by delay measuring circuit 26 is less than ±ZM/2, it is no longer required to transmit it.

Also in this embodiment, a maximum of two image periods is required for a complete V synchronisation between camera 1 and CCU 2.

What is claimed is:

1. A method for synchronising time bases of a first video device which transmits a video signal comprising image information and synchronisation information and of a second video device which receives said composite video signal, comprising the steps of;

a) extracting synchronisation information from the video signal received by the second video device and from the time base of the second video device;

b) determining a phase difference between the video signal received by the second video device and the time base of the second video device based on said extracted synchronisation information;

c) transmitting control information of a first type representative of the amount of said phase difference to said first device;

d) switching, in said first device, the phase of the video signal by a phase angle represented by said first type control information, wherein the first type control information is a binary data word having a predefined number $n \geq 2$ of bits;

e) determining the first type control information and a second type control information such that the sum of phase differences represented by said first and second type control information is the phase difference determined in step b);

f) transmitting the second type control information to said first device; and g) applying a phase shift as represented by said second type control information to the video signal in said first device.

2. The method as claimed in claim 1, wherein steps a) to g) are cyclically repeated.

3. The method of claim 1, wherein step g) is carried out by increasing or decreasing the frequency of the pixel clock signal of the time base of said first device according to the sign of the phase shift represented by said second type control information.

4. The method of claim 1, wherein step g) is carried out by increasing or decreasing the frequency of the pixel clock signal of the time base of said first device according to the amplitude of the phase shift represented by said second type control information.

5. The method as claimed in claim 1, wherein steps c) and d) are carried out only if the phase difference represented by said first type control information is different from zero.

6. The method as claimed in claim 1, wherein a time for carrying out step d) is chosen according to the phase difference determined in step b) such that after carrying out step d) the video signal at the first device assumes a predefined phase.

7. The method as claimed in claim 5, wherein the predefined phase is the beginning of an image in the video signal.

8. The method as claimed in claim 1, wherein the image information comprised in the video signal is formed of a sequence of images, each image comprising a plurality of lines, and the first type control information is representative of a number of lines by which the compositevideo signal received from the first video device is phase shifted with respect to the time base of the second device.

9. The method as claimed in claim 1, wherein the video signal is transmitted in digital form as a sequence of data packets, each data packet comprising image data and at least some of the data packets comprising a sending time data derived from the time base of the first device and representative of a sending time of the packet in which it is comprised, wherein each sending time data, upon receipt by the second device, is compared to receiving time data derived from the time base of the second device, and the second type control information is derived from a difference between said sending and receiving time data.

10. The method as claimed in claim 8, wherein said first device comprises a first counter operating based on a pixel frequency derived from the time base of said first device and the second device comprises a second counter operating based on a pixel frequency derived from the time base of said second device, and wherein a counting value of said first counter is included in a data packet as sending time data, and is compared to a counting value of said second counter as receiving time data.

11. The method as claimed in claim 9, wherein when the difference between counting values of said two counters exceeds a given threshold, the second counter is set to the value received from the first counter.

\* \* \* \* \*